(12) United States Patent
Aufderheide

(10) Patent No.: US 12,422,836 B2
(45) Date of Patent: Sep. 23, 2025

(54) DIAGNOSIS OF TECHNICAL SYSTEMS

(71) Applicant: Siemens Mobility GmbH, Munich (DE)

(72) Inventor: Helge Aufderheide, Munich (DE)

(73) Assignee: Siemens Mobility GmbH, Munich (DE)

( * ) Notice: Subject to any disclaimer, the term of this patent is extended or adjusted under 35 U.S.C. 154(b) by 764 days.

(21) Appl. No.: 17/765,087

(22) PCT Filed: Sep. 4, 2020

(86) PCT No.: PCT/EP2020/074734
§ 371 (c)(1),
(2) Date: Mar. 30, 2022

(87) PCT Pub. No.: WO2021/063629
PCT Pub. Date: Apr. 8, 2021

(65) Prior Publication Data
US 2022/0342404 A1     Oct. 27, 2022

(30) Foreign Application Priority Data

Sep. 30, 2019   (DE) ................ 10 2019 215 068.3

(51) Int. Cl.
G05B 23/02         (2006.01)
G05B 13/02         (2006.01)

(52) U.S. Cl.
CPC ......... G05B 23/024 (2013.01); G05B 13/026 (2013.01); G05B 23/0283 (2013.01)

(58) Field of Classification Search
CPC .............. G05B 23/024; G05B 23/0224; G05B 23/0218; G05B 23/0205; G05B 23/02;
(Continued)

(56) References Cited

U.S. PATENT DOCUMENTS 5,692,404 A    12/1997 Kirii et al.
5,864,782 A    1/1999 Mederer et al.
(Continued)

FOREIGN PATENT DOCUMENTS

CN    1108762 A       9/1995
CN    101899563 A    12/2010
(Continued)

OTHER PUBLICATIONS

Kuncheva et al. "PCA Feature Extraction for Change Detection in Multidimensional Unlabeled Data", 2013, IEEE, pp. 69-80 (Year: 2013).*

(Continued)

*Primary Examiner* — Mohamed Charioui
(74) *Attorney, Agent, or Firm* — Laurence A. Greenberg; Werner H. Stemer; Ralph E. Locher

(57) ABSTRACT

A method for diagnosing a technical system, an apparatus, and a computer program product are provided for carrying out a main component analysis of predefined values for n variables for describing a normal state of the technical system, where n≥2, and at least one main component of the n variables is ascertained. The at least one main component is predefined for describing the normal state of the technical system. Deviations of values for the n variables for describing a current state of the technical system are ascertained from the at least one predefined main component for describing the normal state, in order to infer a fault. A data carrier is also provided.

14 Claims, 1 Drawing Sheet

(58) Field of Classification Search
CPC .. G05B 23/00; G05B 13/026; G05B 13/0205; G05B 13/02; G05B 13/00; G05B 23/0283; G05B 23/0259; G05B 23/02305
See application file for complete search history.

(56) References Cited

U.S. PATENT DOCUMENTS

| | | | |
|---|---|---|---|
| 6,343,261 B1 * | 1/2002 | Iwanowski | G06N 5/04 |
| | | | 714/E11.167 |
| 7,734,451 B2 | 6/2010 | MacArthur et al. | |
| 8,630,962 B2 * | 1/2014 | Maeda | G06F 18/2433 |
| | | | 706/12 |
| 9,720,015 B2 | 8/2017 | Chioua et al. | |
| 10,731,980 B2 | 8/2020 | Alexejenko et al. | |
| 2014/0365179 A1 | 12/2014 | Horowitz et al. | |
| 2017/0092021 A1 | 3/2017 | Nielsen et al. | |
| 2017/0356936 A1 * | 12/2017 | Ismail | G01M 99/005 |
| 2019/0064788 A1 | 2/2019 | Komatsuda et al. | |

FOREIGN PATENT DOCUMENTS

| | | |
|---|---|---|
| CN | 106777719 A | 5/2017 |
| CN | 108490923 A | 9/2018 |
| DE | 4438854 A1 | 5/1996 |
| EP | 2453330 A1 | 5/2012 |
| EP | 3142909 A1 | 3/2017 |
| EP | 3427325 A1 | 1/2019 |
| EP | 3460727 A1 | 3/2019 |
| WO | WO 2015139709 A1 | 9/2015 |

OTHER PUBLICATIONS

Ying Liu Xu Et:; "Audit Collusion Model and AM Mechanism"; Management School ,Shanghai Ji aotong University , Shanghai ,Mar. 2000;Oct. 30, 2005—English abstract on p. 6.

Stief Anna et al:; "Process and alarm data integration under a two-stage Bayesian framework for fault diagnostic"; Dec. 31, 2018; IFAC—PapersOnLine.

* cited by examiner

DIAGNOSIS OF TECHNICAL SYSTEMS

SPECIFICATION

FIELD AND BACKGROUND OF THE INVENTION

The invention relates to a method for diagnosing a technical system, wherein deviations of values relating to at least n, with n≥2, variables for describing a current state of the technical system at a specific time from predefined values for describing a normal state are ascertained in order to infer a fault, to a computer program product and a data carrier and also to an apparatus.

An aim of predictive maintenance is to predict component failures, such as the failure of a bearing or of a cooling system. Normally, components that behave unusually toward other components or compared to their own past are identified. Due to the large number of sensors, components in a train and the dependence of said components on driving behavior, it is difficult to monitor the components automatically and comprehensively and to automatically generate maintenance measures.

Various methods for detecting faults and/or attributing causes of faults have become known. As such, the behavior of identical measured quantities of different components of the same type can be compared using simple metrics, and deviants can be marked as problematic. It is also known practice to produce a so-called engineer's standard curve for the operation of a component, e.g. a pressure response on the basis of a temperature, for example in proportion to the temperature, and the deviation of a measurement from this relationship is monitored in order to detect the deviation of this component from its normal state. An attribution of causes of fault can be mapped using simple rules, e.g. if temperature X>temperature Y and pressure A<pressure B then there is a fault Z.

EP 3 460 727 A1 and EP 3 427 325 A1 disclose methods of the type in question for monitoring and fault identification in technical systems.

EP 3 142 909 A1 also teaches a method for ascertaining an operating stress of a part during the operation of the part. In an alignment phase, measured values relating to different operating modes of the part are used to ascertain a computation rule that can be applied in a subsequent operating phase to ascertain an operating stress.

SUMMARY OF THE INVENTION

The invention is based on the object of being able to perform the diagnosis of a technical system in an automated manner.

The object is achieved by the subjects of the independent patent claims 1 and 10, 11 and 12. Developments and configurations of the invention can be found in the features of the dependent patent claims.

A method according to the invention for diagnosing a technical system, in particular a rail-based vehicle, in particular a rail vehicle, wherein deviations of values, for example of recorded measured values, relating to at least n, with n≥2, different variables for describing a current state of the technical system, in particular of at least one component of the technical system, at a time from predefined values for describing a normal state are ascertained in order to infer a fault, comprises the following method steps:

a. performing a main component analysis of predefined values relating to the at least n, with n≥2, variables and ascertaining at least one main component of the n variables;
b. predefining the at least one main component for describing the normal state of the technical system;
c. ascertaining the deviations of the values relating to the n variables for describing the current state of the technical system from the at least one predefined main component for describing the normal state in order to infer a fault.

The technical system is for example a complex system containing multiple components. According to a first development of the invention, the n variables relate to the same physical quantity and/or describe the state of the same component of the technical system. By way of example, a first variable relates to a temperature $T_1$ of a gear in the region of a bearing of an input shaft and a second variable relates to a temperature $T_2$ of the same gear in the region of a bearing of an output shaft. In this example, the n=2 variables relate to the same measured quantity and the same component.

The values relating to the n variables for describing the current state of the technical system can be recorded, in particular as measured values, at a specific time. A time, as a measure of time that is sufficiently accurate in respect of computation accuracy, should be understood here such that the values can also be recorded within a predefined period. By contrast, this period needs to be short enough to adequately describe the state of the technical system in relation to an event at the specific time. To remain with the example above, $T_1$ and $T_2$ were recorded at the same time.

The values relating to the n variables for describing the current state of the technical system originate in particular from ongoing operation of the technical system. The current state of the technical system can therefore also be referred to as an operating state. Deviations are ascertained between the values relating to the n variables for describing the operating state of the technical system and the values relating to the same n variables for describing the normal state.

As already explained above, the values relating to the n variables for describing the current state of the technical system can be recorded as measured values. This happens during an operating phase of the technical system, for example during a journey by the rail vehicle. The method can then accordingly comprise a further method step for recording the measured values relating to the n variables for describing the current state of the technical system. The technical system can accordingly have a suitably designed measuring device in order to record values relating to each variable.

The values relating to the n variables for describing the current state can also be available as preprocessed values, however. In that case, they are ascertained from recorded measured values, for example. The values relating to the n variables for describing the normal state can likewise be available as measured values that were recorded at times at which the technical system was known to be in a normal state.

In method step a., a main component analysis of the predefined values relating to the at least n variables for describing the normal state of the technical system is first performed, in particular by means of a suitably designed evaluation unit. The result obtained is the main components of the predefined values relating to the n variables. To perform the main component analysis, a state space can be defined pictorially, with the n different variables as dimensions. Returning again to the example above, a two-dimensional graph is drawn up, with $T_1$ and $T_2$ as axes. The values relating to $T_1$ and $T_2$, which were recorded at the same time or which represent the same time, are entered in the graph as one data point, e.g. $T_1$ and $T_2$, each recorded at the time $t_0$, form one data point. If many values are now available at different times $t_0, t_1, t_2, \ldots$, a scatter chart is obtained. A main component analysis is now performed in a known manner. In the case of two variables, two main components are obtained.

Method step a. takes place in particular during a learning phase. Method step b. also takes place in particular in the learning phase: at least one of the ascertained main components for describing the normal state of the technical system, in particular of the at least one component of the technical system, is predefined, in particular by means of the evaluation unit. Main components comprise as straight lines the values relating to the n variables for describing the normal state of the technical system in relation to which the deviation of the values relating to the n variables for describing the operating state are ascertained. Main components are normally represented in vector notation and are thus also referred to as a main component vector.

According to a further development, in method step b. no more than x, with $1 \le x < n$, main components of the n variables for describing the normal state are predefined. In the case of two variables $T_1$ and $T_2$, only one main component for describing the normal state of the technical system is therefore predefined. In a development, exclusively the main components that together cover at least 70% (cumulative percentage), in particular at least 80%, of the total variance of the values of the n variables for describing the normal state are predefined. A further development provides for only the dominant main component, that is to say the main component having the largest share of the total variance of the data, to be predefined.

The main component analysis is accompanied by a data reduction. Extensive datasets are simplified and structured, since a multiplicity of variables are approximated by a small number of main components that are as descriptive as possible. The performance of a main component analysis and the predefining of at least one main component for describing the normal state of the technical system can also be carried out in an automated manner.

In a development, method step a. is carried out for m, with $m \ge 2$, different operating modes of the technical system, in particular driving modes of the rail vehicle. In method step b. the at least one main component for describing the normal state is then selected on the basis of a current operating mode Z of the technical system from the m operating modes, in particular on the basis of the current driving mode of the rail vehicle from the m driving modes, and accordingly predefined for describing the normal state.

The current operating mode Z, for example the current driving mode, is the mode from the m predefined operating modes in which the technical system, for example the rail vehicle, is currently operated and in relation to which the values relating to the n variables for describing the current state of the technical system, in particular of at least one component of the technical system, are recorded or ascertained.

Next, in method steps a. and b. a main component analysis is performed for each of the m predefined operating modes and in each case at least one main component for describing the normal state of the technical system, in particular of the at least one component of the technical system, is predefined in the applicable operating mode Z of the m predefined operating modes. The respective main components are selected on the basis of the current operating mode Z.

In method step c. deviations from the at least one main component would then accordingly be ascertained on the basis of the current operating mode Z. Method step c. would then accordingly read: ascertaining the deviations of the values relating to the n variables for describing the current state of the technical system in an operating mode Z from the m predefined operating modes from the at least one predefined main component for describing the normal state of the technical system in the same operating mode Z of the m predefined operating modes in order to infer a fault.

As an illustration, in general, in method step c., analogously to method step a., a state space is drawn up, in particular by means of the evaluation unit, for the n variables as dimensions and the values relating to the n variables for describing the current state of the technical system are entered, in particular during operation, as (a) data point(s) and the accordingly predefined main component is entered. The deviations of the values relating to the n variables for describing the current state of the technical system from the predefined main component are then ascertained. A fault is inferred from the deviations.

The deviation is ascertained, according to a further development, by ascertaining a distance of the values of the n variables for describing the current state from the at least one predefined main component for describing the normal state.

To this end, the shortest distance vector in relation to the predefined main component (in relation to the main component vector) can be computed for example for every data point from the values relating to the n variables for describing the current state. Subsequently, the norm of the vector is computed. This can be a Euclidean norm or a different metric. By way of example, the root is computed from the sum of the absolute-value bisquares (4th power) of the components of the vector as the norm. Returning again to the example above: the distance vector D with the components $D_1$ and $D_2$ of the data point of the values $T_1$ and $T_2$ at the time $t_0$ for describing the current state of the technical system at the time $t_0$ is computed to form the dominant main component vector. Subsequently, the distance measure PR is computed from the sum of the absolute-value bisquares $PR = D_1^4 + D_2^4$.

In a development, in a method step d. that follows method step c. the extent of the deviation can be taken as a basis for inferring a predefined fault. Different faults and also the causes of said faults may be known and the distance measure can be taken as a basis for detecting a fault and inferring the cause of said fault.

If the value PR computed above is for example less than a system-dependent limit value E1, that is to say PR<E1, then a fault in one of the temperature sensors for recording the temperatures $T_1$ and $T_2$ is inferred, for example the temperature sensor with the largest entry in the distance vector D. On the other hand, if the value is greater than a further system-dependent limit value E2, that is to say PR>E2, then a deviation produced by a driving state is involved.

Besides these and other distance measures, pattern recognition to ascertain the deviation can also be performed in method step c.

Method step c. and, if necessary, method step d. are in particular carried out in an operating phase of the method.

The method can be used to carry out automatic fault type recognition by means of pattern recognition for deviations of operating-state-dependent main components.

The method involves main component analysis being used to learn the combination of sensor values that is most plausible on the basis of the driving state. Comparing this combination with actually measured values results in deviation patterns that are used to predict the fault type for the component and can be used to generate maintenance measures.

Further advantages of the method can be seen in that it allows automatic recognition of unusual component behavior and automatic recognition of sensor and component faults. It also allows simultaneous assessment of the function of a component on the basis of its own behavior and the behavior of equivalent other components without visual inspection. Maintenance requirements can also be generated automatically.

The computer program product, or software program, or just "app" for short, according to the invention is implementable or implemented on a suitably designed evaluation unit, this evaluation unit being or acting as a computer, which means that the method according to the invention is a so-called computer-implemented method, that is to say a method that can be carried out or is carried out by the evaluation unit.

The computer program product comprises instructions that, when the program is executed by the evaluation unit on which it is installed, cause said evaluation unit to carry out the applicable steps of the method according to the invention.

It may also be stored on a data carrier, which for its part therefore comprises instructions that, when executed by a suitable, in particular commercially available, computer, cause said computer to carry out the steps of the method according to the invention. The data carrier in this case can comprise any computer-readable storage medium.

The apparatus according to the invention comprises the technical system and an evaluation unit, the evaluation unit being configured to carry out the method according to the invention. The evaluation unit is suitably designed to:

perform a main component analysis of predefined values relating to n, with n≥2, variables for describing a normal state of the technical system and ascertain at least one main component of the n variables;

predefine the at least one main component for describing the normal state of the technical system;

ascertain deviations of values relating to the n variables for describing a current state of the technical system from the at least one predefined main component for describing the normal state in order to infer a fault.

The technical system may furthermore have suitable means for recording measured values for describing the current state of the system. The technical system is in particular a rail vehicle. The evaluation unit may be arranged on land, for example in a central evaluation device, in which case the rail vehicle has a suitable transmitting unit for transmitting the measured values to land.

The values for describing the current state are appropriately recorded or ascertained on the traveling vehicle and transmitted to land in order to perform method step c. and, if necessary, further, subsequent method steps. Method step c. is performed on land in the central evaluation device. The result or a measure deduced therefrom can, in particular if an intervention in the operation of the technical system, in particular the rail vehicle, is required, for example an immediate stop, be transmitted back to the vehicle again. As a rule, however, a maintenance measure is derived from the result and taken into consideration in the maintenance planning of the vehicle. The land-based evaluation device comprises not only the evaluation unit but also an appropriately suited reception unit for receiving the transmitted data and processing them further.

The invention permits numerous embodiments. It is explained in more detail on the basis of the figures below, which each depict an exemplary configuration. Identical elements in the figures are provided with identical reference signs.

DETAILED DESCRIPTION OF THE INVENTION

Figure 1:
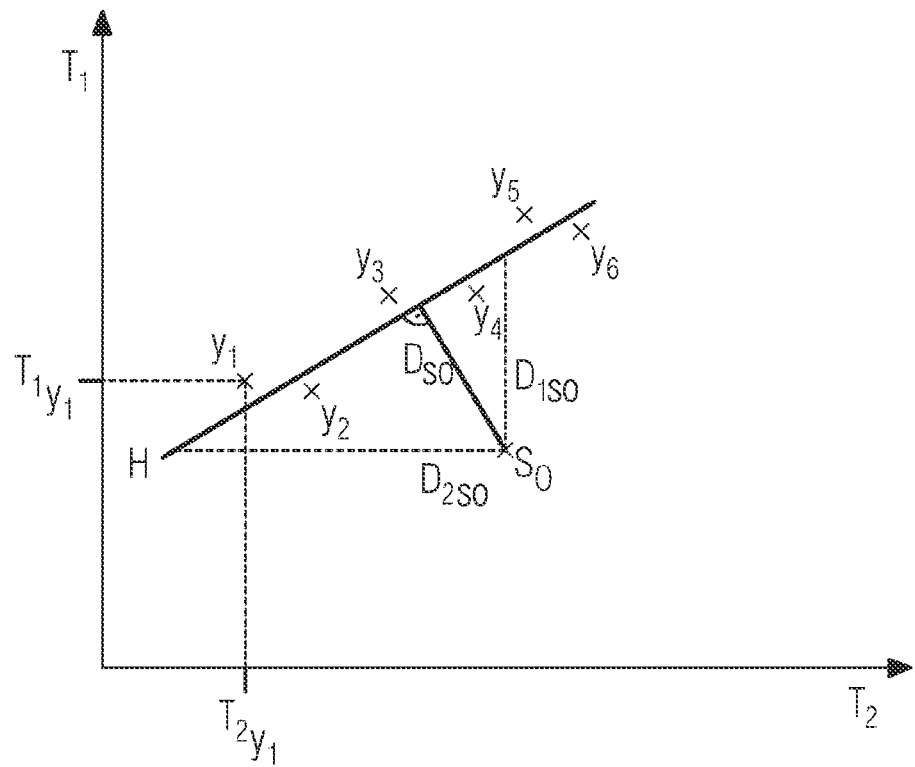
FIG. 1 shows a graph for a main component analysis relating to two variables.

FIG. 1 graphically depicts a main component analysis in a graph. In this exemplary embodiment, only values relating to two variables of the same physical quantity are taken into consideration, in order to ensure a simple representation and to avoid a multidimensional representation of multiple variables.

The graph in FIG. 1 has two coordinate axes $T_1$ and $T_2$, in order to illustrate the functional relationship between the two variables $T_1$ and $T_2$. The data points $Y_j$, $j=1, 2, 3 \ldots$, with the values $(T_{1Yj}, T_{2Yj})$, which represent the same times $t_j$, are predefined for a known operating mode of the technical system and characterize the normal state of the technical system in the predefined operating mode. The predefined values may also be measured values relating to the two variables $T_1$ and $T_2$—that is to say here temperature measured values of different temperature sensors. The measured values relating to each data point have then been recorded at the same time. They may also have been recorded for the same component of the technical system.

During a learning phase, an operating-mode-dependent normal curve is now learned by computing for each operating mode, for example "accelerating", "braking", "traveling at speed", "traveling through a tunnel", "workshop", etc., independently of one another, the main component of the multivariate distribution $(T_1, T_2, \ldots$ of the variables $T_1$ and $T_2, \ldots$ predefined for monitoring and diagnosis. In other words, the dominant eigenvector of the covariance matrix of these sensor signals is computed.

The curve H is now a one-dimensional representation of the most plausible sensor value combinations for the respective underlying driving mode. The curve H is the main component of the predefined values relating to the variables $T_1$ and $T_2$ for describing the normal state of the technical system in the predefined operating mode.

H can be represented in vector notation as $H=(m_1, m_2, m_3, \ldots)+a^* (v_1, v_2, v_3, \ldots)$, where $m_1$ indicates the median of the first sensor signal, $m_2$ indicates the median of the second sensor signal, $m_3$ indicates the median of the third sensor signal, etc., and $v_1, v_2, v_3, \ldots$ indicates the main component vector.

Data points from values relating to the two variables for describing a current operating state are now also entered into the defined state space with the two variables as dimensions for describing the normal state. Each data point represents the values recorded for the two variables during operation at a time $t_0, t_1, t_2 \ldots$. The values $T_{1S0}$ and $T_{2S0}$ of the data point $S_0$ have been recorded by the temperature sensors at a time $t_0$ during the operation of the technical system.

For these data points, the deviation from the learnt normal curve is ascertained. To this end, the vector $D=(D_1, D_2, \ldots)$ with the shortest distance from the applicable operating-mode-dependent normal curve is computed for each data point—illustrated as $D_{S0}=(D_{1S0}, D_{2S0})$. Each entry $D_i$ therein indicates how far the value of the sensor i deviates from the most plausible value in the overall picture.

On the basis of the norm of the vector D, it is then first decided whether said vector describes a normal state. If not, a fault picture is attributed in a second step on the basis of the pattern of deviations (of the entries in the distance vector D).

Specifically, the value $PR=(D_1\hat{\,}4+D_2\hat{\,}4+ \ldots)$ can be computed. If this value is less than a system-dependent limit value $E_1$, that is to say $PR<E_1<2$, then a sensor fault in the sensor with the greatest entry in D is involved. If the value is greater than a system-dependent limit value $E_2$, that is to say $N>PR>E_2>N/2$, then a deviation produced by an operating mode is involved. If, additionally, K components each having L similar sensors are assessed in the same vehicle, then it holds that $3*L/2>PR>L/2$ for a fault in the component to which the sensor with the greatest entry D belongs, while a value of PR close to K can likewise indicate a driving mode that has not yet been recorded.

A pattern that occurs repeatedly in succession and indicates a component failure can be used to generate maintenance requirements.

The method is used to produce automated standard curves that detect irregularities in the operation of components and to derive the fault that exists from the pattern of each irregularity.

Figure 2:
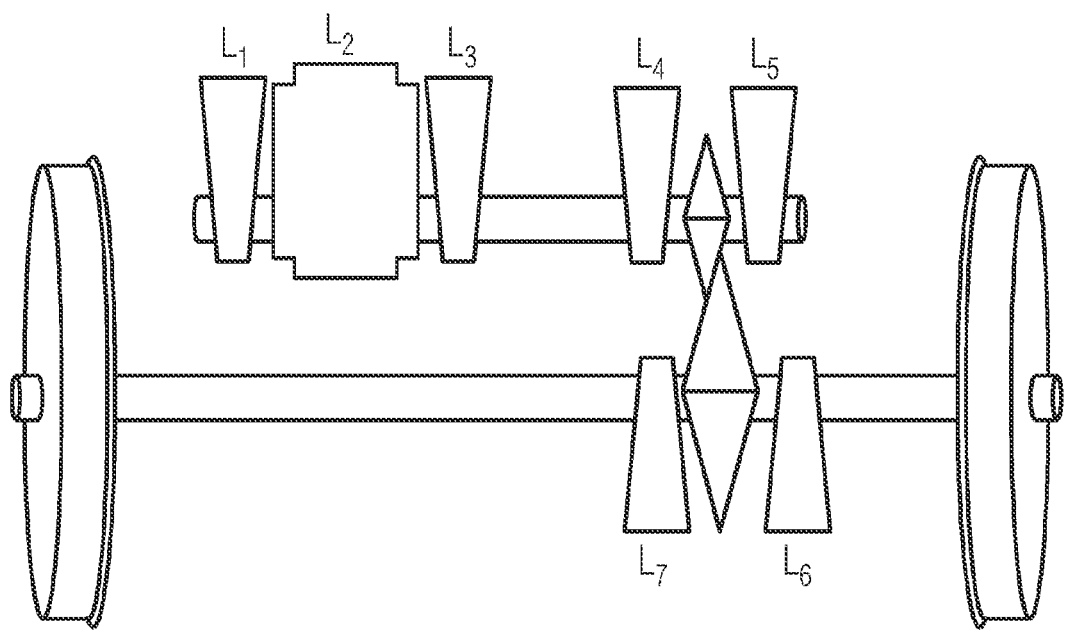
FIG. 2 shows a drive component of a rail vehicle with multiple sensors.

FIG. 2 outlines a drive component of a rail vehicle. Said rail vehicle comprises two wheels on an axle, a driving engine, also called a traction engine, and a gear for transmitting force from a drive shaft to the axle.

To distinguish between sensor, fan and bearing damage in the drive of high-speed trains, besides the exterior temperature and the speed of travel, which are identical for all drive components of a rail vehicle, the time series of the sensors are recorded for each drive component of identical design or of similar design. In the present example, these are:

$L_1$ measures the temperature of a first traction engine bearing, $L_2$ measures the temperature of a laminated stator core, $L_3$ measures the temperature of a second traction engine bearing, $L_4$ measures the temperature of a first gear bearing of a small pinion, $L_5$ measures the temperature of a second gear bearing of the small pinion, $L_6$ measures the temperature of a first gear bearing of a large gearwheel, $L_7$ measures the temperature of a second gear bearing of the large gearwheel.

In addition, wheelset inner bearing temperatures and wheelset outer bearing temperatures can also be recorded.

From a technical point of view, the coupling of the temperatures $T_{L1}$ to $T_{L7}$ exists as a result of the ventilation. The cooling air is taken in at $L_1$, heats up in the traction engine ($L_2$) and is then taken away by the remaining components $L_3$ to $L_7$.

The temperatures of the drive component, which are recorded at different locations, but at the same time in each case, are intended to be used to monitor the function of the drive component. Since the component temperatures influence one another, but an engineering model is not available, the normal operating characteristic curve of the engine (typical distribution of the sensor values) is first determined statistically. Large deviations of a measurement from this characteristic curve are then used to detect a critical state.

The input quantities used are the cited temperatures of each of the drive components of the same design in the rail vehicle, and their normal distribution is produced therefrom. If a main component analysis of a test dataset over a lengthy period reveals for example that over 80% of the variation in the dataset is explained by the first component, this dominant main component is first used as the characteristic curve for the normal drive operation.

The distance from this normal distribution is then computed for new measured values. From the fault patterns, it is recognized whether a sensor fault, problems with a fan, operating-mode-dependent faults or communication problems are involved. Fault reports are produced from the irregularities.

The invention claimed is:

1. A method for diagnosing a rail vehicle by ascertaining deviations of values relating to at least n, with n≥2, variables for describing a current state of the rail vehicle at a specific time from predefined values for describing a normal state of the rail vehicle to infer a fault of a component of the rail vehicle, the method comprising:
   a. performing a main component analysis of predefined values relating to the at least n, with n>2, variables for describing the normal state of the rail vehicle and ascertaining at least one main component of the n variables;
   b. predefining the at least one main component for describing the normal state of the rail vehicle; and
   c. ascertaining the deviations of the values, relating to the n variables for describing the current state of the rail vehicle, from the at least one predefined main component for describing the normal state of the rail vehicle;
   d. inferring the fault of the component of the rail vehicle based on the deviations of the values, relating to the n variables for describing the current state of the rail vehicle, from the at least one predefined main component for describing the normal state of the rail vehicle, wherein the n variables for describing the current state of the rail vehicle are measured values of the component of the rail vehicle; and
   carrying out steps a. and b. during a learning phase, and carrying out steps c. and d. during an operating phase.

2. The method according to claim 1, which further comprises carrying out step a. for each of m, with m≥2, different operating modes, and carrying out step b. by predefining the at least one main component for describing the normal state based on a current operating mode.

3. The method according to claim 1, which further comprises at least one of using the n variables to describe the same physical quantity or using the values of the n variables to describe the state of the same component of the rail vehicle.

4. The method according to claim 1, which further comprises carrying out step b. by predefining no more than x, with 1≤x<n, main components of the n variables for describing the normal state.

5. The method according to claim 4, which further comprises predefining only the main components together covering at least 70% of a total variance of the values of the n variables for describing the normal state.

6. The method according to claim 1, which further comprises carrying out step b. by predefining only a dominant main component.

7. The method according to claim 1, which further comprises carrying out a step d. following step c. by taking an extent of the deviation as a basis for inferring a predefined fault.

8. The method according to claim 1, which further comprises carrying out step c. by ascertaining the deviation by ascertaining a distance of the values of the n variables for describing the current state from the at least one predefined main component for describing the normal state.

9. A non-transitory computer program product with instructions stored thereon that, when executed by a mobile terminal, cause the mobile terminal to perform the steps of claim 1.

10. A data carrier on which the computer program product according to claim 9 is stored.

11. The method according to claim 1, wherein the component of the rail vehicle is a drive component.

12. An apparatus, comprising:
a rail vehicle and an evaluation unit;
said evaluation unit configured to:
  a. perform a main component analysis of predefined values relating to n, with n>2, variables for describing a normal state of the rail vehicle and ascertaining at least one main component of the n variables;
  b. predefine the at least one main component for describing the normal state of the rail vehicle;
  c. ascertain deviations of values relating to the n variables for describing a current state of the rail vehicle from the at least one predefined main component for describing the normal state of the rail vehicle;
  d. infer a fault of a component of the rail vehicle based on the deviations of the values, relating to the n variables for describing the current state of the rail vehicle, from the at least one predefined main component for describing the normal state of the rail vehicle, wherein the n variables for describing the current state of the rail vehicle are measured values of the component of the rail vehicle; and
carry out steps a. and b. during a learning phase, and carry out steps c. and d. during an operating phase.

13. The apparatus according to claim 12, wherein said evaluation unit is further configured to: carry out step a. for each of m, with m≥2, different operating modes, and carry out step b. by predefining the at least one main component for describing the normal state based on a current operating mode.

14. The apparatus according to claim 12, wherein the component of the rail vehicle is a drive component.

* * * * *